(12) United States Patent
Han et al.

(10) Patent No.: US 9,028,971 B2
(45) Date of Patent: May 12, 2015

(54) ODORLESS PAPER COATING LATEX AND PAPER COATING COMPOSITION CONTAINING THE SAME

(75) Inventors: Jung-su Han, Seoul (KR); Chang-sun Han, Daejeon (KR); Ho-yeul Choi, Daejeon (KR); Seung-hun Yang, Daejeon (KR); Ji-sang Jeong, Seoul (KR)

(73) Assignee: LG Chem, Ltd., Seoul (KR)

( * ) Notice: Subject to any disclaimer, the term of this patent is extended or adjusted under 35 U.S.C. 154(b) by 755 days.

(21) Appl. No.: 11/513,946

(22) Filed: Aug. 31, 2006

(65) Prior Publication Data
US 2007/0049662 A1 Mar. 1, 2007

(30) Foreign Application Priority Data

Aug. 31, 2005 (KR) .................. 10-2005-0080740
Jul. 20, 2006 (KR) .................. 10-2006-0067963

(51) Int. Cl.
*D21H 19/44* (2006.01)
*C09D 109/08* (2006.01)
*C09D 109/06* (2006.01)
*C09D 125/10* (2006.01)
*C08K 3/00* (2006.01)
*C08K 5/159* (2006.01)
*C08L 5/00* (2006.01)
*C08L 5/16* (2006.01)
*C08L 91/00* (2006.01)
*D21H 19/54* (2006.01)
*D21H 19/58* (2006.01)
*D21H 21/14* (2006.01)

(52) U.S. Cl.
CPC .............. *D21H 19/44* (2013.01); *C08K 3/0033* (2013.01); *C08K 5/159* (2013.01); *C08L 5/00* (2013.01); *C08L 5/16* (2013.01); *C08L 91/00* (2013.01); *C09D 109/06* (2013.01); *C09D 125/10* (2013.01); *D21H 19/54* (2013.01); *D21H 19/58* (2013.01); *D21H 21/14* (2013.01)

(58) Field of Classification Search
None
See application file for complete search history.

(56) References Cited

U.S. PATENT DOCUMENTS

| | | | | |
|---|---|---|---|---|
| 2,817,640 A | * | 12/1957 | Templin | 524/275 |
| 3,942,995 A | * | 3/1976 | Ichikawa et al. | 106/145.1 |
| 4,782,109 A | * | 11/1988 | DuLaney et al. | 524/501 |
| 5,177,128 A | * | 1/1993 | Lindemann et al. | 524/44 |
| 5,223,311 A | * | 6/1993 | Tsutsumi et al. | 427/388.1 |
| 5,776,842 A | * | 7/1998 | Wood et al. | 442/394 |
| 6,440,535 B1 | * | 8/2002 | Iu et al. | 428/32.1 |
| 6,531,537 B2 | * | 3/2003 | Friel et al. | 524/497 |
| 6,989,191 B2 | * | 1/2006 | Weissgerber et al. | 428/354 |
| 2002/0132861 A1 | * | 9/2002 | Uchiyama et al. | 516/198 |
| 2006/0140902 A1 | * | 6/2006 | MacDonald et al. | 424/76.2 |
| 2007/0237738 A1 | * | 10/2007 | Hanzlicek et al. | 424/76.2 |

FOREIGN PATENT DOCUMENTS

| | | | |
|---|---|---|---|
| JP | 57185372 A | * | 11/1982 |
| KR | 2003037440 A | * | 5/2003 |
| KR | 1020030037440 | | 5/2003 |
| KR | 1020030037440 A | | 5/2003 |
| KR | 1020050004949 | | 1/2005 |

OTHER PUBLICATIONS

Chinese Office Action; Application No. 200680000846.9; Dated Aug. 21, 2009; LG Chem, Ltd.
Notice of Office Action dated Jul. 14, 2011 in India.

* cited by examiner

*Primary Examiner* — Monique Jackson
(74) *Attorney, Agent, or Firm* — McKenna Long & Aldridge, LLP

(57) ABSTRACT

The present invention relates to a paper coating latex comprising 0.001-10 weight part of cyclo-oligosaccharide compound to 100 weight part of styrene-butadiene latex and a paper coating composition containing the same, and according to the present invention, latex petrochemical odors generated during the coating processes by non-reacted monomers and volatile organic compounds remaining in the latex can be eliminated without reducing polymerization productivity and latex stability.

6 Claims, No Drawings

ODORLESS PAPER COATING LATEX AND PAPER COATING COMPOSITION CONTAINING THE SAME

This application claims the benefit of the filing date of Korean patent Application Nos. 10-2005-0080740 filed on Aug. 31, 2005 and 10-2006-0067963 filed on Jul. 5, 2006 in the Korean Intellectual Property Office, the disclosure of which is incorporated herein in its entirety by reference.

TECHNICAL FIELD

The present invention relates to a paper coating latex and a paper coating composition containing the same, and more precisely, an odorless paper coating latex which is free from the foul odor of latex petrochemicals during the paper coating process and a paper coating composition containing the same.

BACKGROUND ART

In general, a paper coating latex is produced by emulsion polymerization. The polymerization conversion ratio of the paper coating latex does not reach 100%, which means that non-reacted monomers or volatile organic compounds remain in the latex, causing a foul odor during paper coating and drawing limitations in practical application.

To eliminate the petrochemical odor generated by non-reacted monomers and volatile organic compounds remaining in the paper coating latex, secondary polymerization is employed, in which a polymerization initiator is added to the latex which has already been through the reaction to polymerize non-reacted monomers. In another deodorization process, inactive gas or vapor is added under vacuum conditions to evaporate non-reacted monomers or volatile organic compounds.

The secondary polymerization has a problem in that volatile organic compounds still remain without being polymerized. The other deodorization process above also has the problems of enormous energy consumption, requiring additional facilities, and generation of bubbles and congelations. If these methods are running continuously, the odor will be reduced but polymerization productivity will be also reduced and the latex petrochemicals cannot be eliminated completely.

DISCLOSURE

Technical Problem

To overcome the above problems of the conventional art, it is an object of the present invention to provide an odorless paper coating latex, and more precisely, a paper coating latex free from the foul odor of latex petrochemicals caused by non-reacted monomers and volatile organic compounds remaining in the latex, without reducing polymerization productivity or the stability of the latex, and a paper coating composition containing the same.

It is also an object of the present invention to provide a paper coated with the coating composition above.

Technical Solution

To achieve the above objects, the present invention provides a paper coating latex comprising 0.001-10 weight part of cyclo-oligosaccharide compound to 100 weight part of styrene-butadiene latex.

The present invention also provides a paper coating composition containing the paper coating latex above and an inorganic pigment.

The present invention further provides a paper coated with the above paper coating composition.

Hereinafter, the present invention is described in detail.

In the course of studying a method to eliminate the petrochemical odor generated from non-reacted monomers and volatile organic compounds remaining in a paper coating latex, the present inventors found out that the addition of cyclo-oligosaccharide compound to the paper coating latex which has already been reacted can eliminate the petrochemical odor, during which perfume can be additionally included, and further completed this invention by confirming that the physical properties of a paper coated with the odorless paper coating latex prepared by the method of the present invention are as good as or better than those of the conventional paper.

(a) Paper Coating Latex

The paper coating latex of the present invention is odorless, and is prepared by adding cyclo-oligosaccharide compound to styrene-butadiene latex which has already been reacted.

The styrene-butadiene latex can be prepared by the emulsion polymerization that is well-known to those in the art, with a conversion rate of 96-99% and a solid component content of 40-55%.

The cyclo-oligosaccharide compound is a high molecular organic compound harboring a hydrophobic cavity, which is selected from a group consisting of cyclodextrin derivatives such as α-cyclodextrin, β-cyclodextrin, γ-cyclodextrin and hydroxylpropyl-β-cyclodextrin, cycloinulohexose, cycloinuloheptose, cycloinulactose, calixarene, and a mixture of at least two of the above.

The cyclo-oligosaccharide compound is preferably included at 0.001-10 weight part for 100 weight part of styrene-butadiene latex, which is the optimum content to eliminate the petrochemical odor and at the same time give excellent printing properties to paper.

The paper coating latex containing cyclo-oligosaccharide compound can additionally include perfume.

The perfume is selected from a group consisting of natural perfume, synthetic perfume, combined perfume and a mixture of at least two of the perfumes.

The natural perfume includes all the plant perfumes obtained from flowers, leaves, pericarp, resin, bark, fruits, seeds or roots, and all the animal perfumes obtained from the sexual glands or epidermal glands of musk deer, sperm whales, beavers or musk cats.

All the synthetic perfumes are possibly used herein. When natural perfume components are difficult to extract or are generated in very little amounts, a synthetic perfume is produced by analyzing and separating the perfume thereof and synthesizing the components.

The combined perfumes are prepared by the combination of a natural perfume and a synthetic perfume.

The preferable content of such a perfume is 0.0001-20 weight part for 100 weight part of styrene-butadiene latex, which is the optimum content to eliminate a petrochemical odor and to give stability to the latex and enhance the printing properties of the paper.

To the styrene-butadiene latex were added cyclo-oligosaccharide compound and perfume at 20-40° C., followed by stirring for 10 minutes and dispersing to give a paper coating latex.

(b) Paper Coating Composition

The paper coating composition of the present invention includes the paper coating latex of (a) and an inorganic pigment.

The paper coating latex of (a) can be used as a binder.

The inorganic pigment can be one or more compounds selected from a group consisting of inorganic compounds such as calcium carbonate, clay, silicon, aluminum, zinc, zirconium and titania and slurry type products.

The preferable content of the inorganic pigment is 50-99 weight part for 100 weight part of the paper coating composition.

The paper coating composition can additionally include thickening agents, lubricants, insolubilizers or fluorescent agents.

(c) Coated Paper

The paper of the present invention is coated with the paper coating composition of (b).

BEST MODE

Practical and presently preferred embodiments of the present invention are illustrated in the following Examples.

However, it will be appreciated that those skilled in the art, on consideration of this disclosure, may make modifications and improvements within the spirit and scope of the present invention.

EXAMPLES

Example 1

(a) Preparation of a Paper Coating Latex

To 100 weight part of the styrene-butadiene paper coating latex with a conversion rate of 98% and a solid component content of 50% was added 10 weight part of β-cyclodextrine at room temperature, followed by stirring for 10 minutes and dispersing to give a paper coating latex.

(b) Preparation of a Paper Coating Composition

To 13 weight part of the paper coating latex of (a) were added 60 weight part of first grade clay, 40 weight part of calcium carbonate and 1.3 weight part of starch. To the mixture was added distilled water to adjust the content of the solid component in the coating composition to 67.3% to give a paper coating composition of the present invention.

(c) Preparation of a Paper

Stencil paper was coated with the paper coating composition of (b) under the following conditions, resulting in the coated paper of the present invention.

Coating: Rod Coating, No 6
Drying: Oven, 105° C., 30 seconds
Calender: Supercalender, 80° C., 100 kg/cm, 4 m/min, 2-times
Stencil paper: Commercial stencil paper (Basis weight 72 gsm)

Example 2

Experiments were performed in the same manner as described in Example 1 except that β-cyclodextrine was added at 5 weight part for the preparation of the paper coating latex of Example 1.

Example 3

Experiments were performed in the same manner as described in Example 1 except that β-cyclodextrine was added at 0.001 weight part for the preparation of the paper coating latex of Example 1.

Example 4

Experiments were performed in the same manner as described in Example 1 except that hydroxypropyl-β-cyclodextrine was added at 10 weight part for the preparation of the paper coating latex of Example 1 instead of β-cyclodextrine.

Example 5

Experiments were performed in the same manner as described in Example 1 except that hydroxypropyl-β-cyclodextrine was added at 0.001 weight part for the preparation of the paper coating latex of Example 1 instead of β-cyclodextrine.

Example 6

Experiments were performed in the same manner as described in Example 1 except that γ-cyclodextrine was added at 10 weight part for the preparation of the paper coating latex of Example 1 instead of β-cyclodextrine.

Example 7

Experiments were performed in the same manner as described in Example 1 except that ρ-cyclodextrine was added at 0.001 weight part for the preparation of the paper coating latex of Example 1 instead of β-cyclodextrine.

Example 8

Experiments were performed in the same manner as described in Example 1 except that 5 weight part of β-cyclodextrine and 5 weight part of Pine oil, natural perfume with pine flavor, were added for the preparation of the paper coating latex.

Example 9

Experiments were performed in the same manner as described in Example 1 except that 5 weight part of β-cyclodextrine and 5 weight part of Calone oil, synthetic perfume with sea flavor, were added for the preparation of the paper coating latex.

Example 10

Experiments were performed in the same manner as described in Example 1 except that 5 weight part of β-cyclodextrine and 5 weight part of Pleasure (Estee Lauder), combined perfume, were added for the preparation of the paper coating latex.

Comparative Example 1

Experiments were performed in the same manner as described in Example 1 except that β-cyclodextrine was not added.

Comparative Example 2

Experiments were performed in the same manner as described in Example 1 except that β-cyclodextrine was added at 0.0005 weight part.

Comparative Example 3

Experiments were performed in the same manner as described in Example 1 except that β-cyclodextrine was added at 20 weight part.

Experimental Example

The physical properties of the odorless paper coating latex, the paper coating compositions and the paper produced in the above Examples and Comparative Examples were investigated and the results are shown in Table 1.

Odor test—Sensory evaluation by the sense of smell was carried out and the lower the point, the more excellent the property was (point 1—very comfortable, point 10—very uncomfortable). To confirm whether an odor eliminating effect continued, the odor test was first performed right after the production of the latex and again 3 days after standing at room temperature.

Low-shear viscosity—The low-shear viscosity was measured with a BF viscometer. The viscosity of the coating solution was measured by using a #3 rotor at 60 rpm for 1 minute and the value was presented by cPs.

High-shear viscosity—The high-shear viscosity was measured with a Hercules Viscometer (KRK type, model KC-801C) at 6600 rpm (unit: cPs).

Stability—The prepared coating solution was stirred at 60° C. for 10 minutes. The produced congelation was filtered with a #325 mesh and the stability was measured with a Maron Tester. The unit was ppm. The higher the value, the lower the stability went.

Adhesive strength—After printing several times with an RI printer, the degree of picking was observed by the naked eye and evaluated by a 5-point method. The higher the point, the more excellent the adhesive strength was. Inks with tack values of 12, 14 and 16 were used. The obtained points were averaged.

Water resistance—Water was added into the RI printer by using a molten roll, followed by printing. The degree of picking was measured in the same manner as used to measure the adhesive strength. Ink with a tack value of 14 was used and the water resistance was measured after printing once.

Ink drying speed—After printing with the RI printer, smearing was observed and evaluated by a 5-point method. The higher the point, the faster the ink dried.

Ink repellence—Water was added into the RI printer, followed by printing. Then, ink transfer was measured. Ink with a low tack value was used to prevent picking. The higher the point, the higher the Ink repellence was.

Paper gloss—An Optical Gloss Meter (HUNTER type, 75°~75°) was used to measure the paper gloss in various parts of the coated paper and the obtained points were averaged.

Print gloss—24 hours after printing with the RI printer, the print gloss was measured in the same manner as was used to measure the paper gloss.

TABLE 1

|  |  | Example | | | | | | | | | | Comparative Example | | |
|---|---|---|---|---|---|---|---|---|---|---|---|---|---|---|
|  |  | 1 | 2 | 3 | 4 | 5 | 6 | 7 | 8 | 9 | 10 | 1 | 2 | 3 |
| Odor | Right after | 1 | 2 | 5 | 1 | 6 | 1 | 5 | 1 | 1 | 1 | 9 | 8 | 1 |
|  | Leave 3 days | 1 | 1 | 4 | 1 | 4 | 1 | 4 | 2 | 2 | 2 | 9 | 8 | 1 |
| Low-shear viscosity (cPs) | | 930 | 930 | 928 | 929 | 927 | 933 | 930 | 930 | 932 | 933 | 925 | 926 | 931 |
| High-shear viscosity (cPs) | | 20.6 | 20.4 | 20.3 | 20.6 | 20.4 | 20.5 | 20.3 | 20.6 | 20.7 | 20.5 | 20.3 | 20.9 | 21.1 |
| Stability (ppm) | | 50 | 55 | 53 | 49 | 51 | 48 | 55 | 50 | 55 | 53 | 51 | 57 | 53 |
| Adhesive strength | | 4.0 | 4.1 | 4.2 | 4.0 | 4.2 | 4.0 | 4.2 | 4.2 | 4.2 | 4.2 | 4.2 | 4.2 | 3.5 |
| Water resistance | | 4.0 | 4.1 | 4.2 | 4.0 | 4.2 | 4.0 | 4.2 | 4.1 | 4.1 | 4.1 | 4.2 | 4.2 | 3.0 |
| Ink drying speed | | 4.0 | 4.0 | 4.0 | 4.0 | 4.0 | 4.0 | 4.0 | 4.0 | 4.0 | 4.0 | 4.0 | 4.4 | 4.0 |
| Ink repellence development | | 4.1 | 4.1 | 4.0 | 4.1 | 4.0 | 4.1 | 4.0 | 4.1 | 4.1 | 4.1 | 4.1 | 4.2 | 4.0 |
| Paper gloss | | 63.0 | 63.1 | 62.9 | 63.0 | 63.1 | 63.2 | 63.2 | 63.0 | 63.1 | 62.9 | 63.0 | 63.1 | 63.0 |
| Print gloss | | 80.5 | 81.0 | 80.4 | 80.7 | 81.0 | 81.0 | 81.0 | 80.5 | 81.0 | 80.4 | 81.2 | 81.1 | 81.0 |

As shown in Table 1, the paper coating latexes of Examples 1-7, prepared by adding 0.001-10 weight part of cyclo-oligosaccharide compound to 100 weight part of styrene-butadiene latex, and those of Examples 8-10, prepared by adding perfume in addition to cyclo-oligosaccharide compound to styrene-butadiene latex were confirmed to be odorless and the physical properties of the paper coating composition containing the above latex and the paper coated with the same were also confirmed to be very excellent.

In the meantime, the physical properties of the paper coating compositions of Comparative Examples 1 and 2 which do not include, or include only a small amount, of cyclo-oligosaccharide compound were confirmed to be at a similar level but a deodorization effect was not observed. The paper coating latex of Comparative Example 3 containing an overdose of cyclo-oligosaccharide compound exhibited excellent deodorization effect but poor printing properties such as adhesive strength and water resistance.

INDUSTRIAL APPLICABILITY

The present invention provides a paper coating latex with the elimination of odor generated by non-reacted monomers and volatile organic compounds remaining in latex during paper coating processes without reducing polymerization productivity and latex stability. The present invention further provides a paper having excellent printing properties which is coated with the paper coating composition containing the paper coating latex of the present invention.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. A paper, coated with a paper coating composition,
wherein the paper coating composition comprises an odorless paper coating latex; an inorganic pigment; starch; and distilled water,
wherein the odorless paper coating latex comprises 100 weight parts of styrene-butadiene latex having a solid component content of 40 to 55% and having a conversion rate of 96 to 99%; 0.001 to 10 weight part of cyclo-oligosaccharide compound as a continuous odor remover for removing odors generated by non-reacted monomers; and 0.0001 to 20 weight part of a perfume,
wherein the inorganic pigment is selected from the group consisting of calcium carbonate, clay, silicon, aluminum, zinc, zirconium, and titania, and
wherein the content of the inorganic pigment is 50 to 99 weight part based on 100 weight part of the paper coating composition.

2. The paper according to claim 1, wherein the cyclo-oligosaccharide compound is one or more selected from the group consisting of α-cyclodextrin, β-cyclodextrin, γ-cyclodextrin, hydroxylpropyl-β-cyclodextrin, cycloinulohexose, cycloinuloheptose, cycloinulactose and calixarene.

3. The paper according to claim 1, wherein the perfume is one or more selected from a group consisting of plant perfume, animal perfume, synthetic perfume and a combined perfume thereof.

4. The paper according to claim 1, wherein the paper coating composition includes one or more additives selected from a group consisting of thickening agents, lubricants, insolubilizers and fluorescent agents.

5. The paper according to claim 1, wherein a print gloss of the paper, measured by OPTICAL GLOSS METER (HUNTER type, 75°-75°) after 24 hours from printing, is 80.4 to 81.0.

6. The paper according to claim 1, wherein the perfume is one or more selected from a group consisting of pine oil, and a synthetic perfume with sea flavor.

* * * * *